(12) United States Patent
Owings

(10) Patent No.: US 6,335,743 B1
(45) Date of Patent: *Jan. 1, 2002

(54) METHOD AND SYSTEM FOR PROVIDING A RESIZE LAYOUT ALLOWING FLEXIBLE PLACEMENT AND SIZING OF CONTROLS

(75) Inventor: Brian Joseph Owings, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,944

(22) Filed: Aug. 11, 1998

(51) Int. Cl.$^7$ ................................. G06F 3/00
(52) U.S. Cl. ................. 345/801; 345/781; 345/800; 345/788; 345/765; 345/762
(58) Field of Search ................. 345/342, 333, 345/334, 340, 335, 348

(56) References Cited

U.S. PATENT DOCUMENTS

| | | | | |
|---|---|---|---|---|
| 4,890,098 A | | 12/1989 | Dawes et al. ................. | 340/721 |
| 5,060,170 A | | 10/1991 | Bourgeois et al. .......... | 364/521 |
| 5,390,295 A | | 2/1995 | Bates et al. ................. | 395/157 |
| 5,404,441 A | * | 4/1995 | Satoyama .................... | 345/334 |
| 5,434,964 A | | 7/1995 | Moss et al. ................. | 395/157 |
| 5,666,498 A | | 9/1997 | Amro .......................... | 345/342 |
| 5,671,378 A | * | 9/1997 | Acker et al. ................. | 345/334 |
| 5,699,535 A | | 12/1997 | Amro .......................... | 395/342 |
| 5,751,283 A | * | 5/1998 | Smith .......................... | 345/342 |
| 5,873,106 A | * | 2/1999 | Joseph ......................... | 407/506 |
| 5,886,694 A | * | 3/1999 | Breinberg et al. .......... | 345/340 |
| 5,903,265 A | * | 5/1999 | Bogdan ....................... | 345/334 |
| 5,977,966 A | * | 11/1999 | Bogdan ....................... | 345/334 |

* cited by examiner

Primary Examiner—Raymond J. Bayerl
Assistant Examiner—Cuong T. Thai
(74) Attorney, Agent, or Firm—Sawyer Law Group LLP; Prentiss W. Johnson

(57) ABSTRACT

A system and method for providing a window capable of being resized is disclosed. The window includes at least one control. In one aspect, the method and system include allowing a developer to place the at least one control in a desired position in the window and allowing a developer to set how the at least one control is to move upon resizing of the window. In the first aspect, the method and system further include moving the at least one control in accordance with how the developer has set the at least one control to be moved upon resizing of the window when the window is resized. In another aspect, the method and system include allowing a developer to place the at least one control in a desired position in the window and allowing the developer to set how the at least one control is to be resized upon resizing of the window. In this aspect, the method and system further include resizing the at least one control in accordance with how the developer has set the at least one control to be resized upon resizing of the window when the window is resized.

21 Claims, 5 Drawing Sheets

METHOD AND SYSTEM FOR PROVIDING A RESIZE LAYOUT ALLOWING FLEXIBLE PLACEMENT AND SIZING OF CONTROLS

FIELD OF THE INVENTION

The present invention relates to user interfaces and more particularly to a method and system for allowing a developer to lay out a window that can be resized in a more flexible fashion.

BACKGROUND OF THE INVENTION

A window that an end user sees is typically composed of controls. These controls include input fields, labels, drop down lists, buttons, text areas, and other items that an end user may see in a window. The window is typically developed in a multi-step process. A window is first laid out by a developer. The corresponding code is then generated. This corresponding code creates the window provided to the end user.

A developer typically lays out the window by utilizing a conventional form designer. The form designer is a tool used to allow a developer to graphically lay out the controls in the window. A form designer is also known as a dialog editor or a form editor. Once the window is laid out, the corresponding code is generated. Typically, the corresponding code includes code automatically generated in response to particular controls and code added by a programmer. The window is created by the corresponding code. The window can then be presented to an end user.

Often a developer wishes to lay out a window which can be resized by the end user. It is also often desirable to provide controls in the window which will be resized or moved when the window is resized. For example, the window may contain text areas which should remain in the center of the window and change size as the size of the window changes size. When the window is made smaller, the text area should move to remain in the center of the smaller window. The text area should also reduce in size as the window is made smaller.

Conventional layout managers are a feature provided by some languages, such as Java. Some conventional form designers allow for the type and attributes of conventional layout managers to be set and generate the code used to create the conventional layout managers. A developer can then use the conventional layout manager to lay out a window which will be resized. The conventional layout managers define how the controls contained within the window will move when the window is resized. The conventional layout managers also typically define how the controls will be sized. Using these conventional layout managers, the developer can lay out a window which will automatically resize and move the controls within the window. Without the conventional layout manager, controls within the window are not moved or resized when the window is resized.

Although the conventional layout managers allow a developer to lay out a window having controls which will be moved or resized when the window is resized, a developer also typically wishes to have absolute discretion in the initial positioning and size of controls. This discretion allows a developer to easily obtain the desired look of the window. However, conventional layout managers are relatively inflexible. Conventional layout managers typically require a developer to place controls in specific portions of the window. Some conventional layout managers also automatically set the size of controls placed within the window. Thus, when using a conventional layout manager, a developer is restricted in how controls within a window are placed or sized.

In order to obtain more freedom initial placement and sizing controls, a developer might not use a conventional layout manager. However, if no layout manager is used, controls within the window are not moved or resized when the window is resized. A developer might also use a conventional layout manager that allows the developer more freedom in placement of controls. However, such conventional layout managers are typically complex to use.

Accordingly, what is needed is a more flexible system and method for laying out a window which will automatically resize or move controls when the window is resized. The present invention addresses such a need.

SUMMARY OF THE INVENTION

The present invention provides a method and system for providing a window capable of being resized. The window includes at least one control. In one aspect, the method and system include allowing a developer to place the at least one control in a desired position in the window and allowing a developer to set how the at least one control is to move upon resizing of the window. In the first aspect, the method and system further include moving the at least one control in accordance with how the developer has set the at least one control to be moved upon resizing of the window when the window is resized. In another aspect, the method and system include allowing a developer to place the at least one control in a desired position in the window and allowing the developer to set how the at least one control is to be resized upon resizing of the window. In this aspect, the method and system further include resizing the at least one control in accordance with how the developer has set the at least one control to be resized upon resizing of the window when the window is resized.

According to the system and method disclosed herein, the present invention provides more freedom to a developer while allowing controls to be resized or moved when a window is resized. Thus, relatively windows may be more easily laid out.

DETAILED DESCRIPTION OF THE INVENTION

The present invention relates to an improvement in providing user interfaces, such as windows. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Form designers are used by developers to graphically lay out a window. Some form designers allow for the specification and use of a variety of conventional layout managers. Typically, a conventional layout manager defines how controls contained in the window will move and resize when the window is resized. The conventional layout manager also typically defines where controls can be placed as well as the initial size of the control.

Figure 1:
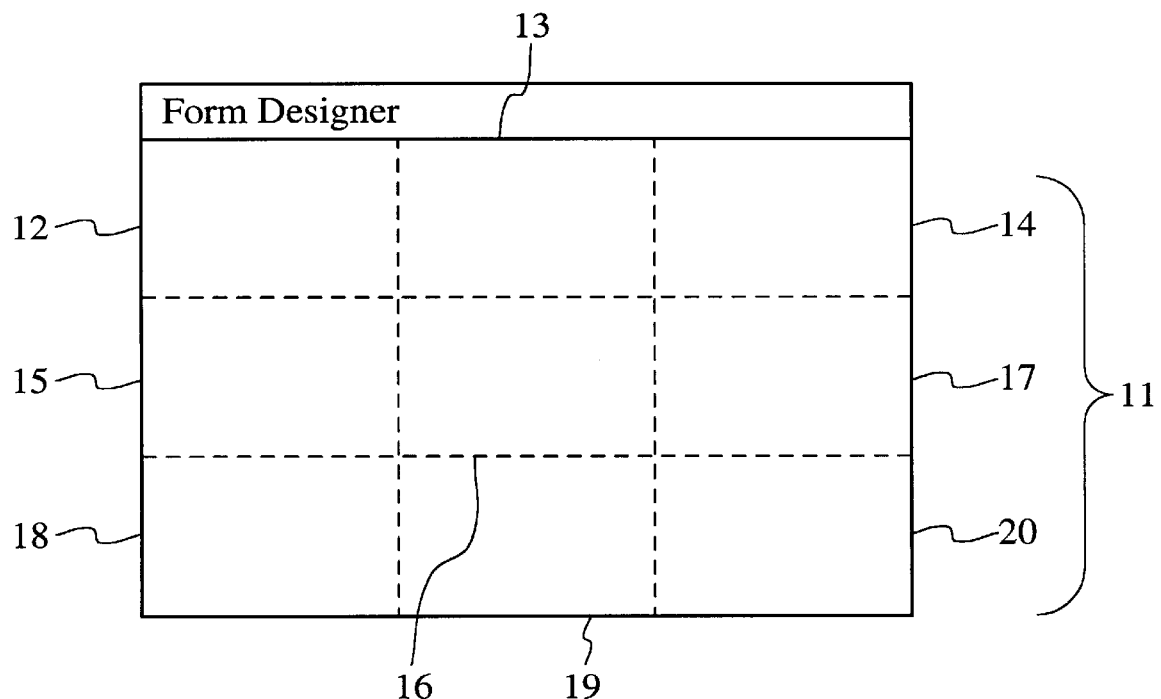
FIG. 1 is a diagram of a form designer during use of a conventional layout manager.

For example, FIG. 1 depicts a form designer 10 in which a conventional layout manager, known as a grid layout, is used. The form designer 10 is being used to lay out a window 11. The grid layout is available when the window 11 is created using Java. A grid layout divides a window into any number of equally sized rows and columns. FIG. 1 depicts a grid layout that divides the window 11 into nine predefined areas 12 through 20. Although dashed lines delineate the nine areas 12 through 20 in FIG. 3, many conventional layout managers do not indicate the boundaries of individual areas. In addition, for the conventional layout managers which do display boundaries, such as the lines delineating the areas 12 through 20, the boundaries are displayed only when the window 11 is being designed. The boundaries are not shown in the final version of the window 11. In order for the grid bag layout to move or resize controls (not shown) placed in the window 11, the controls must be placed in one of the predefined areas 12–20. Thus, the grid layout also determines the initial position of each of the controls placed in the window 21.

Java also provides other conventional layout managers. For example, Java provides a flow layout, a border layout, and a grid bag layout. The flow layout orders controls from the upper left corner of the window 11 to the lower right corner of the window 11. Thus, the first control selected by a developer is placed in the upper left corner of the window 11. The second control is placed to the right of the first control. This would continue for all controls to be placed in the window 11, wrapping around to the left edge when the right end is reached on a particular line. In addition, the flow layout also controls the size of each control. The flow layout typically ensures that each control is just wide enough and high enough to display text in the control. Consequently, controls having different amounts of text will be sized differently. Thus, the flow layout also sets the initial placement and size of controls.

The border layout divides the window into five areas. These areas are known as north, south, east, west, and center and correspond to the top, bottom, right, left, and center, respectively, of the window 11. Controls placed in the north and south areas are made as small as possible in height. Controls placed in the east and west areas are made as small as possible in width. The remainder of the window 11 is used for the control in the center. Thus, the border layout also sets the size of controls.

The grid bag layout divides the window 11 into a particular number of cells. The developer can specify the number of cells in the vertical and horizontal dimensions of the window 11. A user can also adjust the size of the cell. The developer then specifies which of the cells are to be associated with each control. Thus, the user places controls in the appropriate area by defining which of the cells are associated with the control. Thus, the grid bag layout also sets the size of the controls.

Figure 2:
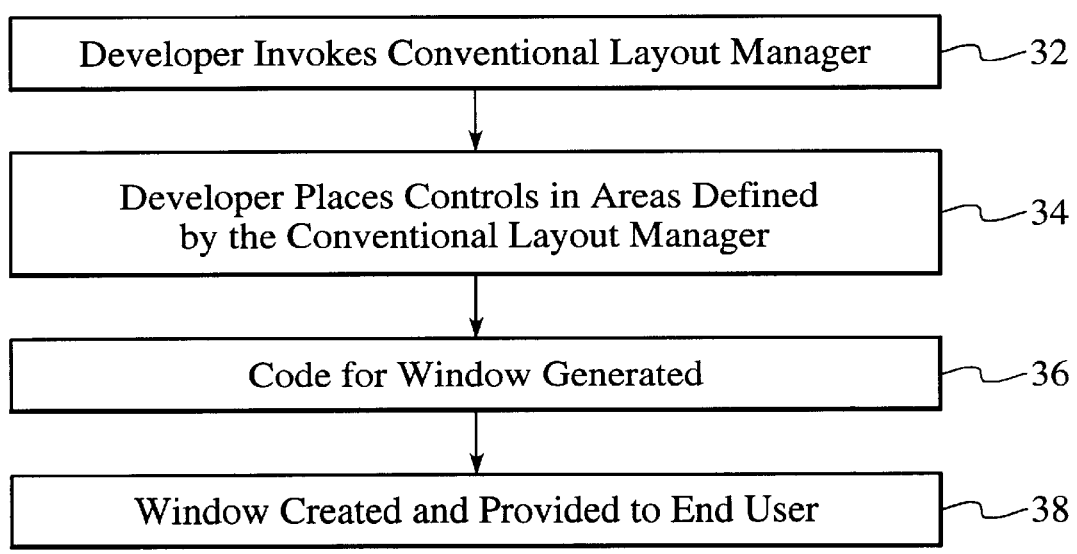
FIG. 2 is a flow chart depicting a conventional method for using a conventional layout manager to provide a window.

FIG. 2 is flow chart of a method 30 for utilizing a conventional layout manager of a form designer to lay out a window having controls which are moved or resized when the window is resized. A developer typically invokes the conventional layout manager, via step 32. Generally, the developer invokes the conventional layout manager by specifying the type and attributes of the conventional layout manager. The developer also places controls in the areas defined by the conventional layout manager, via step 34. Note that the developer could invoke the conventional layout manager after placement of controls in step 34. Typically, the size and position of the control will be governed differently based on the area in which the control is placed, the order in which the controls are placed, and the conventional layout manager used. Thus, if the flow layout is being used, then in step 34 the first control will be placed in the upper right corner of the window 11 and sized to be just large enough to fit the contained text. If the grid bag layout is used, then in step 34 the developer places the control in the desired location and associates particular cells with the control. Step 34 might also include sizing the cells if the grid bag layout is used.

The code for the window is then generated, via step 36. The window created is then provided to an end user, via step 38. When a user resizes the window, the controls will be moved or resized based on the conventional layout manager used and the area in the window in which the control is placed.

Although the conventional layout managers discussed are capable of resizing controls when the window 11 is resized, those with ordinary skill in the art will realize that the conventional layout managers restrict the initial placement of controls and set the initial size of controls. In contrast, developers desire to have relatively complete discretion in the initial placement and sizing of controls. This discretion allows a developer to obtain the desired look for the window. Without this, it is difficult to lay out a window as desired, For example, the flow layout minimizes the size of each control and places the first control in the upper left corner of the window 11. Similarly, the border layout minimizes the height of control placed in the north and south areas. As a result, the conventional layout managers may restrict the layout of the window 11. Even if a developer can force the control to be of the appropriate size or in the appropriate place in the window 21, additional time and effort are required. For example, when using the flow layout, a developer may ensure that controls for labels are substantially the same size by adding extra blank characters to the text of the label control. This increases the time that the developer must expend when designing a window. Thus, a developer cannot simply set the initial position and initial size.

To obtain more flexibility in the initial positioning and size of controls, a developer either could not use a conventional layout manager or could use a different conventional layout manager. If no layout manager is used, the controls within the window 11 will not be moved or resized upon resizing of the window 11. This may be undesirable for the window 11 being laid out. Conventional layout managers which are more flexible are difficult to use. For example, the grid bag layout allows a developer to specify the position and size of a control. However, to do so, a developer must specify individual cells associated with the control. This is relatively difficult and time consuming.

Thus, conventional layout managers make layout of a window difficult because the initial placement and sizing of controls is typically not within the complete discretion of the developer. It is also difficult for a developer to maintain the desired look of the window because the developer cannot initially obtain the desired look due to the resizing and placement of controls. Moreover, even where the developer is given more freedom in placement and size of controls, setting the placement and size of controls is relatively difficult.

The present invention provides for a method and system for providing a window capable of being resized. The window includes at least one control. In one aspect, the method and system include allowing a developer to place the at least one control in a desired position in the window and allowing a developer to set how the at least one control is to move upon resizing of the window. In the first aspect, the method and system further include moving the at least one control in accordance with how the developer has set the at least one control to be moved upon resizing of the window when the window is resized. In another aspect, the method and system include allowing a developer to place the at least one control in a desired position in the window and allowing the developer to set how the at least one control is to be resized upon resizing of the window. In this aspect, the method and system further include resizing the at least one control in accordance with how the developer has set the at least one control to be resized upon resizing of the window when the window is resized.

The present invention will be described in terms of a particular window containing certain controls. The present invention will also be described in terms of particular commands and arguments of the commands. However, one of ordinary skill in the art will readily recognize that this method and system will operate effectively for other windows having different controls therein as well as other commands using other arguments.

Figure 3:
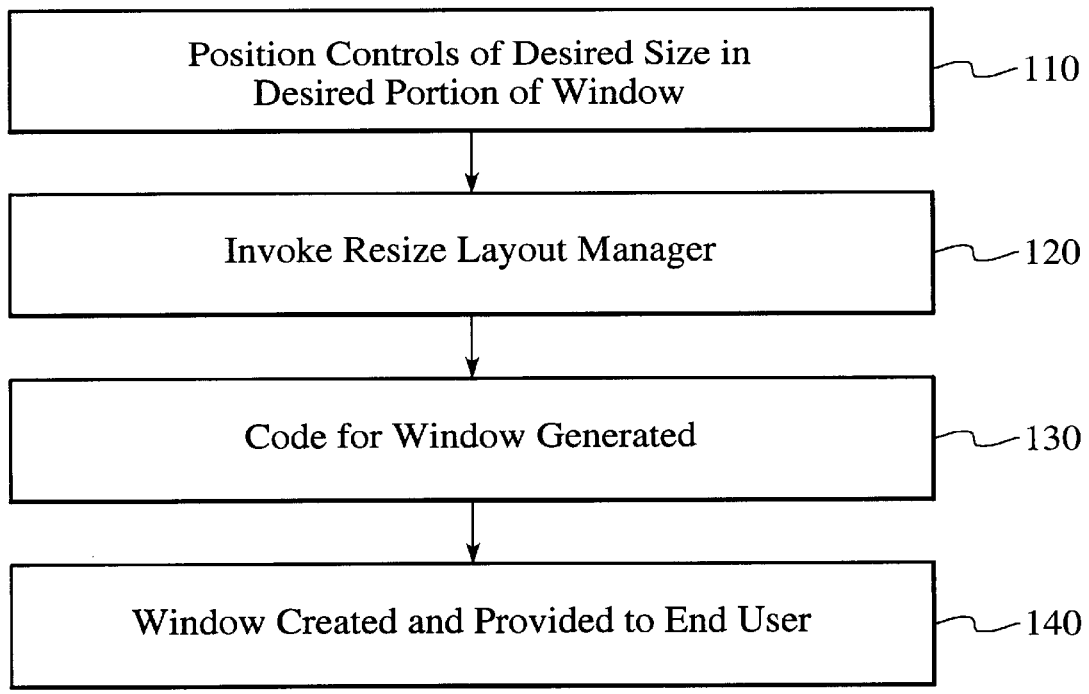
FIG. 3 is a flow chart of a method for laying out a window utilizing a resize layout manager in accordance with the present invention.

To more particularly illustrate the method and system in accordance with the present invention, refer now to FIG. 3 depicting a flow chart of a method 100 for providing a window in accordance with the present invention. The developer places the controls having the desired size in the desired portion of the window via step 110. Thus, in step 110 the developer is allowed to control the initial size and initial position of the controls. Consequently, the developer can obtain the desired look of the window being laid out.

The developer then invokes the resize layout manager, via step 120. The resize layout manager will control the resizing and movement, if any, of the controls when the window is resized. Preferably, the resize layout manager is implemented in Java. The to resize layout manager does not change the initial positioning or size of the controls in the window. Thus, the desired look of the window is maintained. The code for the window is then generated, via step 130. The window is then created and provided to the end user, via step 140. Thus, the window may be displayed on an end user's computer in step 140.

Figure 4:
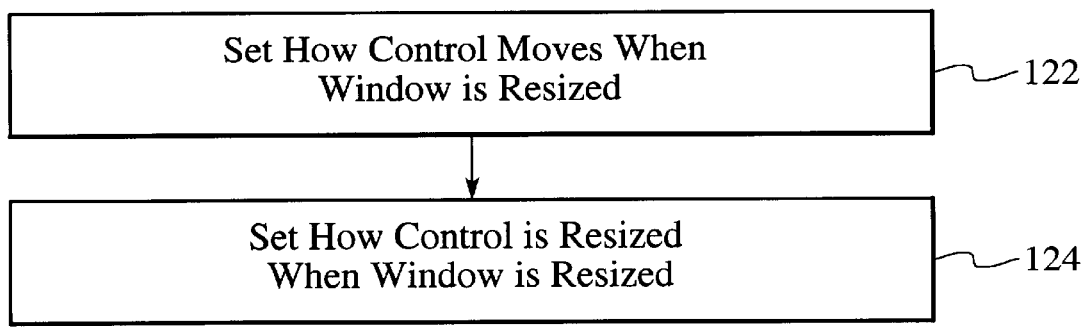
FIG. 4 is a flow chart depicting one embodiment of a method for utilizing the layout manager in accordance with the present invention.

FIG. 4 depicts one embodiment of the step 120 of invoking the resize layout manager. The developer sets how the control is to be moved when the window is resized, via step 122. The developer sets how the control is to be resized when the window is resized, via step 124. Although both steps 122 and 124 are performed in a preferred embodiment, nothing in the present invention requires that both steps 122 and 124 be performed. In a preferred embodiment, steps 122 and 124 are performed by using a command having five arguments. The command is used for each control that will be moved or resized. The first argument specifies the control to be governed by the resize layout manager. The second argument specifies the movement of the control horizontally across an end user's display when the window is resized. The third argument specifies the movement of the control vertically across the end user's display when the window is resized. The fourth argument specifies how the width of the control changes when the window is resized. The fifth argument specifies how the height of the control changes when the window is resized. In a preferred embodiment, the second argument specifies the movement right when the window is enlarged. In the preferred embodiment, the third argument specifies the movement down when the window is enlarged. In the preferred embodiment, the fourth argument specifies the stretching of the width of the control when the window is enlarged. In the preferred embodiment, the fifth argument specifies the stretching in height when the window is enlarged.

Also in a preferred embodiment, the second through fifth arguments are between zero and one. A zero in the second or third argument indicates that the control does not move horizontally or vertically, respectively, when the window is resized. A zero in the fourth or fifth indicates that the control is not resized horizontally or vertically, respectively, when the window is resized. A 0.5 in the second or third argument indicates that the control moves horizontally or vertically, respectively, half of the distance resized. A 0.5 in the fourth or fifth indicates that the control is stretched horizontally or vertically, respectively, when by half of the amount resized. A one in the second or third argument indicates that the control moves horizontally or vertically, respectively, the full distance resized. A one in the fourth or fifth indicates that the control is stretched horizontally or vertically, respectively, when by the full amount resized.

Figure 5:
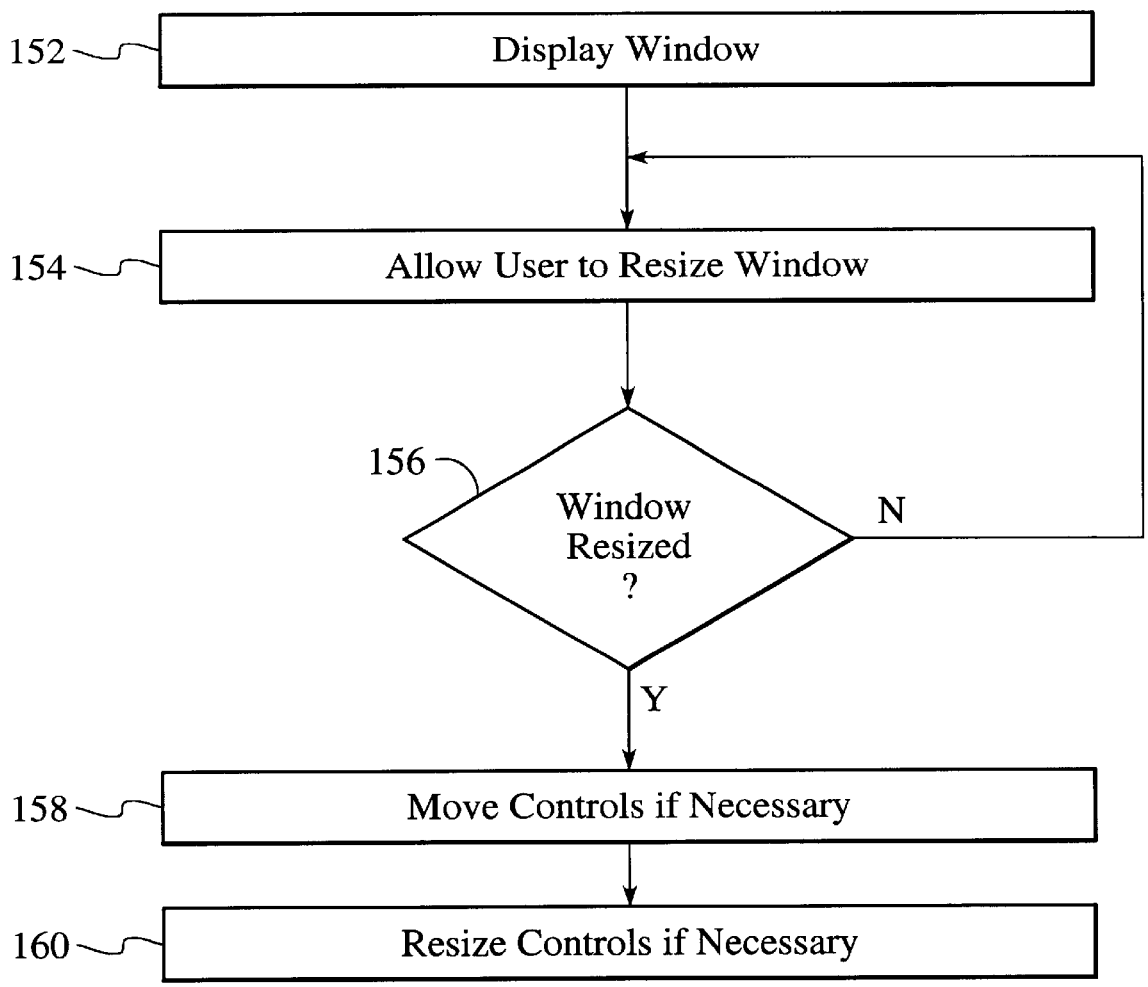
FIG. 5 is a flow chart depicting one embodiment of a method for resizing a window in accordance with the present invention.

FIG. 5 depicts one embodiment of a method 150 in accordance with the present invention for governing the controls when the window is resized. The window is displayed via step 152. The end user is then allowed to resize the window, via step 154. Note that step 154 may not need to be specifically carried out. It is then determined if the window has been resized, via step 156. If the window is not resized, then the user is still allowed to resize the window, via step 154. If, however, the window is resized, then the resize layout manager moves the controls if necessary, via step 158. The resize layout manager also resizes the controls if necessary, via step 160. A control is moved if the developer has specified in step 122 that the control is to be moved upon resizing of the window. A control is resized if the developer has specified in step 124 that the control is to be resized upon resizing of the window.

Figure 6:
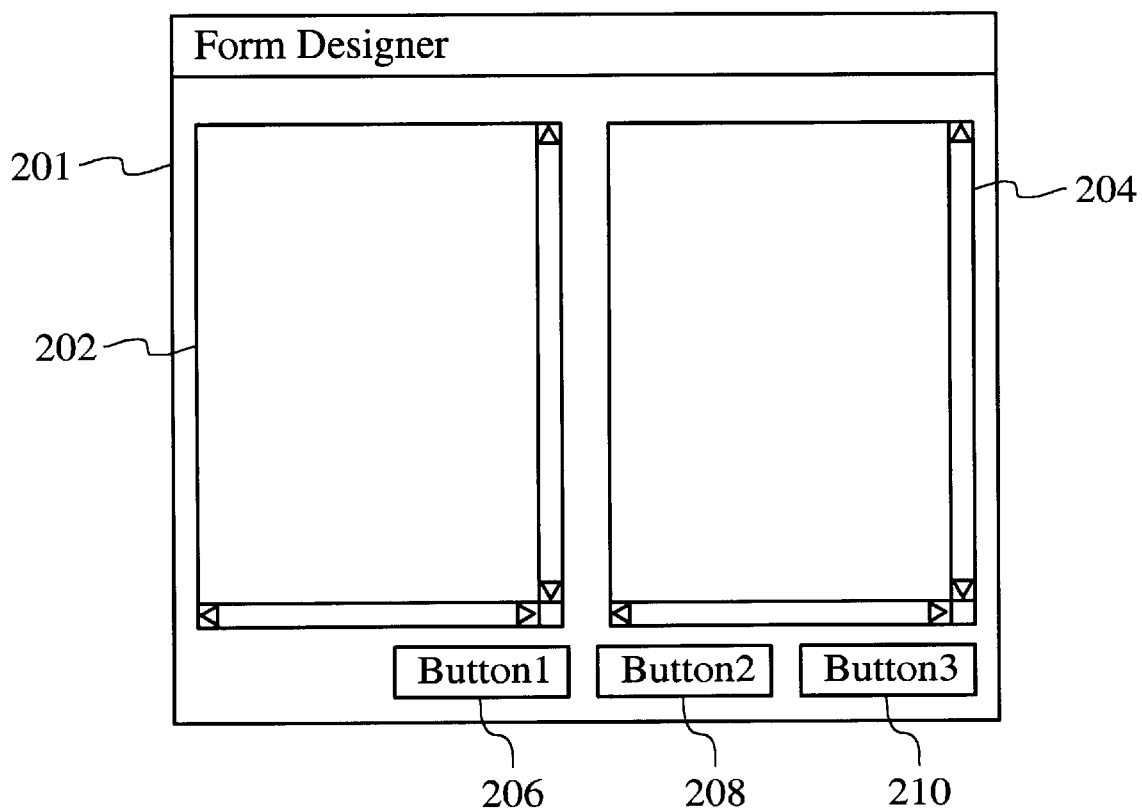
FIG. 6 is a diagram of one embodiment of a window laid out in accordance with the present invention.

FIG. 6 depicts one embodiment of a form designer 200 using the resize layout manager in accordance with the present invention. The form designer 200 is being used to lay out a window 201. The window 201 includes five controls 202, 204, 206, 208, and 210. The controls are text areas 202 and 204 and button1 206, button2 208, and button3 210. Because the developer is using the method 100 to lay out the window 201, the developer can place the controls as desired in the window 200. In addition, the sizing of the controls is at the developer's discretion. Thus, the developer may be substantially unrestricted in placement and sizing of text areas 202 and 204 and button1 206, button2 208, and button3 210.

Figure 7A:
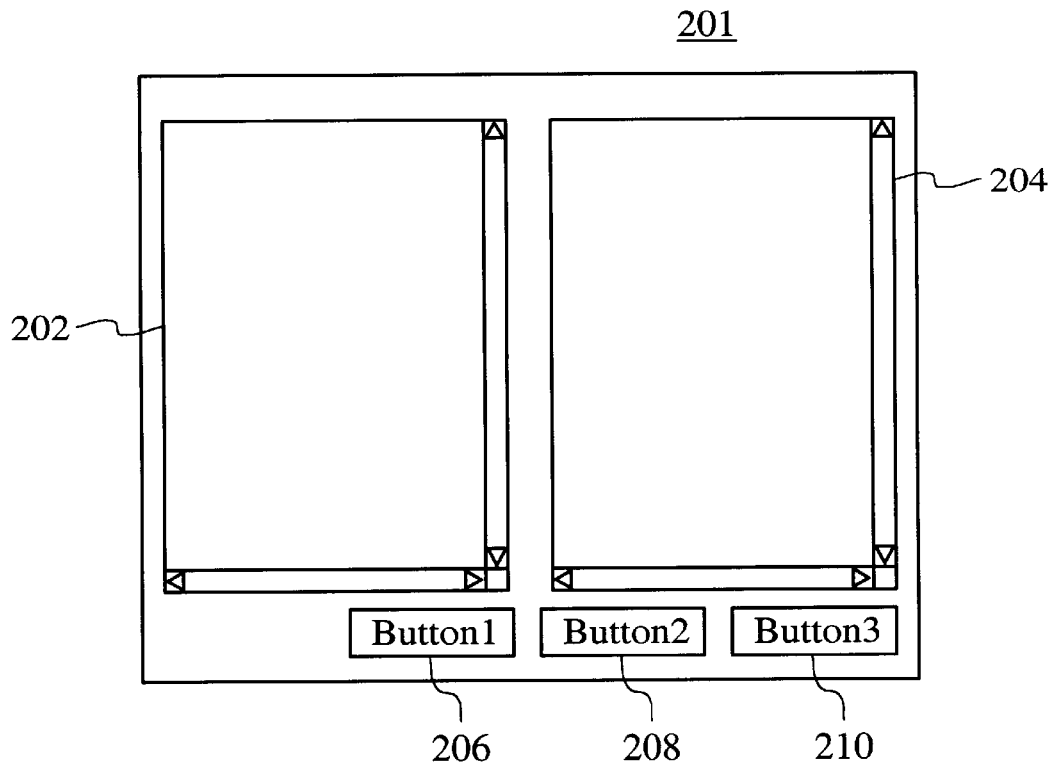
FIG. 7A is a diagram of one embodiment of a form designer having a window laid out in accordance with the present invention.
Figure 7B:
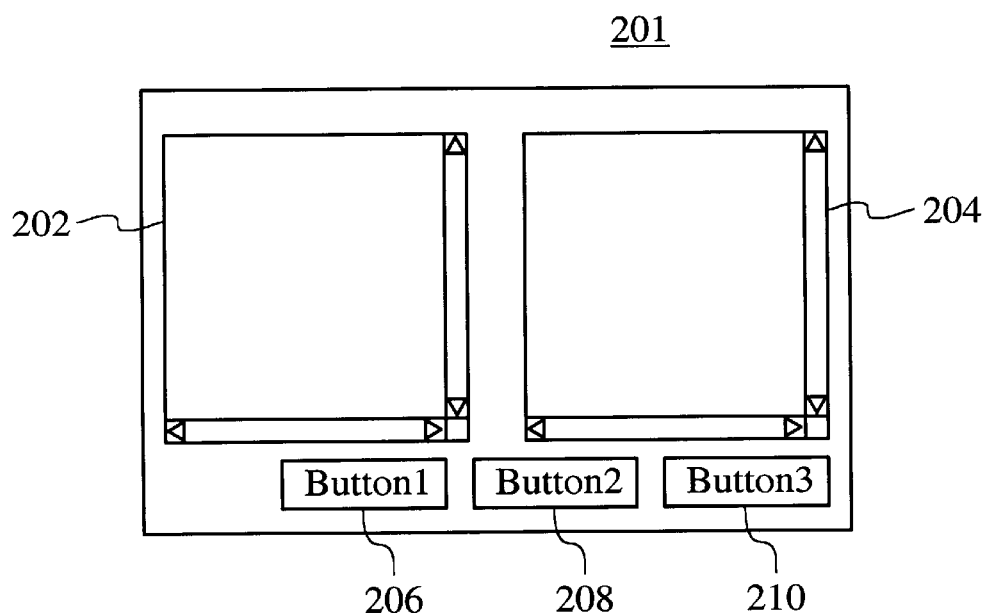
FIG. 7B is a diagram of one embodiment of a resized window laid out in accordance with the present invention.

FIGS. 7A and 7B depict the window 201 that is controlled by the resize layout manager in accordance with the present invention. The window 201 depicted in FIG. 7A is substantially as the developer laid it out in the form designer 200. Thus, FIG. 7A depicts the window 200 prior to resizing. The window 201 still includes five controls 202, 204, 206, 208, and 210. The controls are text areas 202 and 204 and button1 206, button2 208, and button3 210. FIG. 7B depicts the window 201 after a user has resized the window. The text areas 202 and 204 have been resized. In addition, the text area 204 has been moved. The button1 206, button2 208, and button3 210 have not been resized. However, the button1 206, button2 208, and button3 210 have been moved.

Because the developer is substantially unrestricted in placement and sizing of the controls 202–210, it is relatively simple for the developer to graphically lay out the window 201 having the desired look. In addition, because the developer laid out the window 201 using the method 100 form designer 200 in accordance with the present invention, this look is not altered by the resize layout manager. In addition, the developer can easily specify how individual controls 202–210 are to be moved or resized when the window 201 is resized. Some controls, such as button1 206, button2 208, and button3 210, may be moved only. Some controls, such as text area 202, may be resized only. Some controls, such as text area 204, may be both moved and resized. The resize layout manager moves or resizes the controls 202–210 once the window 201 is resized. Thus, a developer can relatively easily create a window having controls which are moved or resized when the window is resized.

A method and system has been disclosed for providing a window in which controls may be moved or resized when the window is resized. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a window capable of being resized, the window including at least one control, the method comprising the steps of:
    (a) allowing a developer to place the at least one control in a desired initial position in the window and to set a desired initial size for each of the at least one control, the at least one control being initially displayed in the window at the desired initial position and with the desired initial size when the window is provided;
    (b) allowing a developer to set how the at least one control is to move upon resizing of the window; and
    (c) moving the at least one control in accordance with how the developer has set the at least one control to be moved upon resizing of the window when the window is resized.

2. The method of claim 1 further comprising the steps of:
    (d) allowing the developer to set how the at least one control is to be resized upon resizing of the window; and
    (e) resizing the at least one control in accordance with how the developer has set the at least one control to be resized upon resizing of the window when the window is resized.

3. The method of claim 2 further comprising the steps of:
    (f) providing code to create the window including the at least one control; and
    (g) displaying the window.

4. The method of claim 1 wherein the desired initial position of the at least one control is any position with the window desired by the developer that allows at least a portion of the control to reside in the window and wherein the desired initial size for the at least one control is any size smaller than the window desired by the developer.

5. A method for providing a window capable of being resized, the window including at least one control, the method comprising the steps of:
    (a) allowing a developer to place the at least one control in a desired initial position in the window and to set a desired initial size for each of the at least one control, the at least one control being initially displayed in the window at the desired initial position and with the desired initial size when the window is provided;
    (b) allowing the developer to set how the at least one control is to be resized upon resizing of the window; and
    (c) resizing the at least one control in accordance with how the developer has set the at least one control to be resized upon resizing of the window when the window is resized.

6. The method of claim 4 further comprising the steps of:
    (d) providing code to create the window including the at least one control; and
    (e) displaying the window.

7. The method of claim 5 wherein the desired initial position of the at least one control is any position with the window desired by the developer that allows at least a portion of the control to reside in the window and wherein the desired initial size for the at least one control is any size smaller than the window desired by the developer.

8. A system for providing a window capable of being resized, the window including at least one control, the system comprsing:
    means for allowing a developer to place the at least one control in a desired initial position in the window and to set a desired initial size for each of the at least one control, the at least one control being initially displayed in the window at the desired initial position and with the desired initial size when the window is provided;
    means for allowing a developer to set how the at least one control is to move upon resizing of the window; and
    means for moving the at least one control in accordance with how the developer has set the at least one control to be moved upon resizing of the window when the window is resized.

9. The system of claim 8 further comprising:
    means for allowing the developer to set how the at least one control is to be resized upon resizing of the window; and
    means for resizing the at least one control in accordance with how the developer has set the at least one control to be resized upon resizing of the window when the window is resized.

10. The system of claim 9 further comprising:
    means for providing code to create the window including the at least one control; and
    means for displaying the window.

11. The system of claim 8 wherein the desired initial position of the at least one control is any position with the window desired by the developer that allows at least a portion of the control to reside in the window and wherein the desired initial size for the at least one control is any size smaller than the window desired by the developer.

12. A system for providing a window capable of being resized, the window including at least one control, the system comprising:

means for allowing a developer to place the at least one control in a desired initial position in the window and to set a desired initial size for each of the at least one control, the at least one control being initially displayed in the window at the desired initial position and with the desired initial size when the window is provided;

means for allowing the developer to set how the at least one control is to be resized upon resizing of the window; and means for resizing the at least one control in accordance with how the developer has set the at least one control to be resized upon resizing of the window when the window is resized.

13. The system of claim 12 further comprising:

means for providing code to create the window including the at least one control;

means for displaying the window.

14. The system of claim 12 wherein the desired initial position of the at least one control is any position with the window desired by the developer that allows at least a portion of the control to reside in the window and wherein the desired initial size for the at least one control is any size smaller than the window desired by the developer.

15. A computer-readable medium having a program for providing a window capable of being resized, the window including at least one control, the program containing instructions for:

(a) allowing a developer to place the at least one control in a desired initial position in the window and to set a desired initial size for each of the at least one control, the at least one control being initially displayed in the window at the desired initial position and with the desired initial size when the window is provided;

(b) allowing a developer to set how the at least one control is to move upon resizing of the window; and (c) moving the at least one control in accordance with how the developer has set the at least one control to be moved upon resizing of the window when the window is resized.

16. The computer-readable medium of claim 15 wherein the program further contains instructions for:

(d) allowing the developer to set how the at least one control is to be resized upon resizing of the window; and (e) resizing the at least one control in accordance with how the developer has set the at least one control to be resized upon resizing of the window when the window is resized.

17. The computer-readable medium of claim 16 wherein the program further contains instructions for:

(f) providing code to create the window including the at least one control; and (g) displaying the window.

18. The computer-readable medium of claim 15 wherein the desired initial position of the at least one control is any position with the window desired by the developer that allows at least a portion of the control to reside in the window and wherein the desired initial size for the at least one control is any size smaller than the window desired by the developer.

19. A computer-readable medium having a program for providing a window capable of being resized, the window including at least one control, the program containing instructions for:

(a) allowing a developer to place the at least one control in a desired initial position in the window and to set a desired initial size for each of the at least one control, the at least one control being initially displayed in the window at the desired initial position and with the desired initial size when the window is provided;

(b) allowing the developer to set how the at least one control is to be resized upon resizing of the window; and (c) resizing the at least one control in accordance with how the developer has set the at least one control to be resized upon resizing of the window when the window is resized.

20. The computer-readable medium of claim 19 wherein the program further includes instructions for:

(d) providing code to create the window including the at least one control; and (e) displaying the window.

21. The computer-readable medium of claim 19 wherein the desired initial position of the at least one control is any position with the window desired by the developer that allows at least a portion of the control to reside in the window and wherein the desired initial size for the at least one control is any size smaller than the window desired by the developer.

* * * * *